(12) United States Patent
Strand et al.

(10) Patent No.: US 9,055,055 B1
(45) Date of Patent: Jun. 9, 2015

(54) PROVISIONING ACCOUNT CREDENTIALS VIA A TRUSTED CHANNEL

(71) Applicant: Amazon Technologies, Inc., Reno, NV (US)

(72) Inventors: William Alexander Strand, Issaquah, WA (US); Jesper Mikael Johansson, Redmond, WA (US); Luan Khai Nguyen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 13/923,830

(22) Filed: Jun. 21, 2013

(51) Int. Cl.
*H04L 9/32* (2006.01)
*H04L 9/00* (2006.01)
*H04L 29/06* (2006.01)

(52) U.S. Cl.
CPC .................................. *H04L 63/0815* (2013.01)

(58) Field of Classification Search
CPC ....... H04L 63/08; H04L 63/10; H04L 63/123; H04L 63/101; H04L 63/083; H04L 63/1815; G06F 21/31; G06F 21/32; G06F 21/42
USPC .......................... 726/1–10; 713/168–170, 189; 709/223–225, 229
See application file for complete search history.

(56) References Cited

U.S. PATENT DOCUMENTS

| | | | |
|---|---|---|---|
| 6,732,278 B2* | 5/2004 | Baird et al. .................. | 726/7 |
| 7,975,292 B2* | 7/2011 | Corella ....................... | 726/6 |
| 8,234,695 B2* | 7/2012 | Eldridge et al. ............. | 726/5 |
| 2012/0227094 A1* | 9/2012 | Begen et al. ................ | 726/4 |

OTHER PUBLICATIONS

U.S. Patent Application entitled "Authentication Manager" filed Aug. 12, 2009, having U.S. Appl. No. 12/539,886.
U.S. Patent Application entitled "Managing Security Credentials" filed Jul. 29, 2011, having U.S. Appl. No. 13/194,287.
U.S. Patent Application entitled "Account Management for Multiple Network Sites" filed Feb. 1, 2012, having U.S. Appl. No. 13/363,654.
U.S. Patent Application entitled "Authentication Management Services" filed Feb. 1, 2012, having U.S. Appl. No. 13/363,664.
U.S. Patent Application entitles "Presenting Managed Security Credentials to Network Sites" filed Feb. 1, 2012, having U.S. Appl. No. 13/363,675.
U.S. Patent Application entitled "Recovery of Managed Security Credentials" filed Feb. 1, 2012, having U.S. Appl. No. 13/363,681.
U.S. Patent Application entitled "Logout from Multiple Network Sites" filed Feb. 1, 2012, having U.S. Appl. No. 13/363,658.
U.S. Patent Application entitled "Mapping Stored Client Data to Requested Data Using Metadata" filed Nov. 16, 2012, having U.S. Appl. No. 13/679,254.
U.S. Patent Application entitled "Passwordless Strong Authentication Using Trusted Devices" filed Sep. 8, 2011, having U.S. Appl. No. 13/228,192.

* cited by examiner

*Primary Examiner* — Hosuk Song
(74) *Attorney, Agent, or Firm* — Thomas | Horstemeyer, LLP

(57) ABSTRACT

Disclosed are various embodiments for provisioning client credentials via a trusted channel. A client computing device is configured to access a trusted channel of communication. An account configuration manager automatically requests access to accounts linked to the trusted channel of communication. A respective security credential communication is received for the accounts via the trusted channel of communication. One or more applications are configured to access the accounts based at least in part on the respective security credential communications.

20 Claims, 10 Drawing Sheets

157a

```
From: Facespace Account Management <no-reply@facespace.site>
To: johnsmith@nmail.site
Subject: Password Reset Request for "johnsmith@nmail.site"

Dear John:

We recently received a password reset request on 4/25/2009 at 23:59 UTC for your
account. This request originated from Internet Protocol address 127.0.0.1.

To complete your password reset, please visit the following web page:
https://www.facespace.site/password-reset.cgi?token=M9fnXapOzNPQ Warmest regards,
The Facespace Team
```

PROVISIONING ACCOUNT CREDENTIALS VIA A TRUSTED CHANNEL

BACKGROUND

Users of mobile devices often rely upon many different accounts with many different service providers. For example, a user may have an email account, a social networking account, a shopping account, a gaming account, a newspaper subscription account, and so on. In some cases, an account may be associated with a particular mobile application, and two or more mobile applications may use different respective accounts. These accounts may have their own respective usernames, passwords, and/or other security credentials. It may be difficult for users to remember all of their security credentials for all of their various accounts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A is a drawing of an example email message employed as a security credential communication in the networked environment of FIG. 1 according to various embodiments of the present disclosure.

DETAILED DESCRIPTION

The present disclosure relates to provisioning credentials for multiple different accounts through the use of a trusted channel or device. Users often have to contend with a multiplicity of different accounts for different applications, network sites, and other service providers. Users typically have to keep up with many different security credentials, such as usernames and passwords. A single username and password combination for multiple accounts may not be possible due to username collisions and differing username/password requirements, and even if it were possible, it would generally be regarded as a security risk. Applications may enable storing security credentials for future use. Nonetheless, a user may have to manually supply security credentials when installing new applications or registering applications on a new device.

Various embodiments of the present disclosure provide an automated approach to registering and/or authenticating multiple accounts for a device that is considered trusted. For example, as an initial step of setting up a mobile device, a user may configure an email account, including providing security credentials for the email account. The mobile device then may be regarded as a trusted device once authenticated with the email provider. The user may have designated an email address corresponding to the email account for use in security credential resets for the other accounts of the user. Because the device has access to the email account, security credentials for the other accounts may be reset, with a token being sent to the trusted device via the email account.

In various embodiments, this reset process may be automated for multiple accounts of the user, and may involve automatic configuration of temporary or device-specific authentication tokens in lieu of an actual reset of the security credentials. Further, in various embodiments, any medium of communication to a trusted device may be employed, including emails to a preconfigured email address, phone calls to a preconfigured telephone number, text messages to a preconfigured telephone number, and so on. In the following discussion, a general description of the system and its components is provided, followed by a discussion of the operation of the same.

Figure 1:
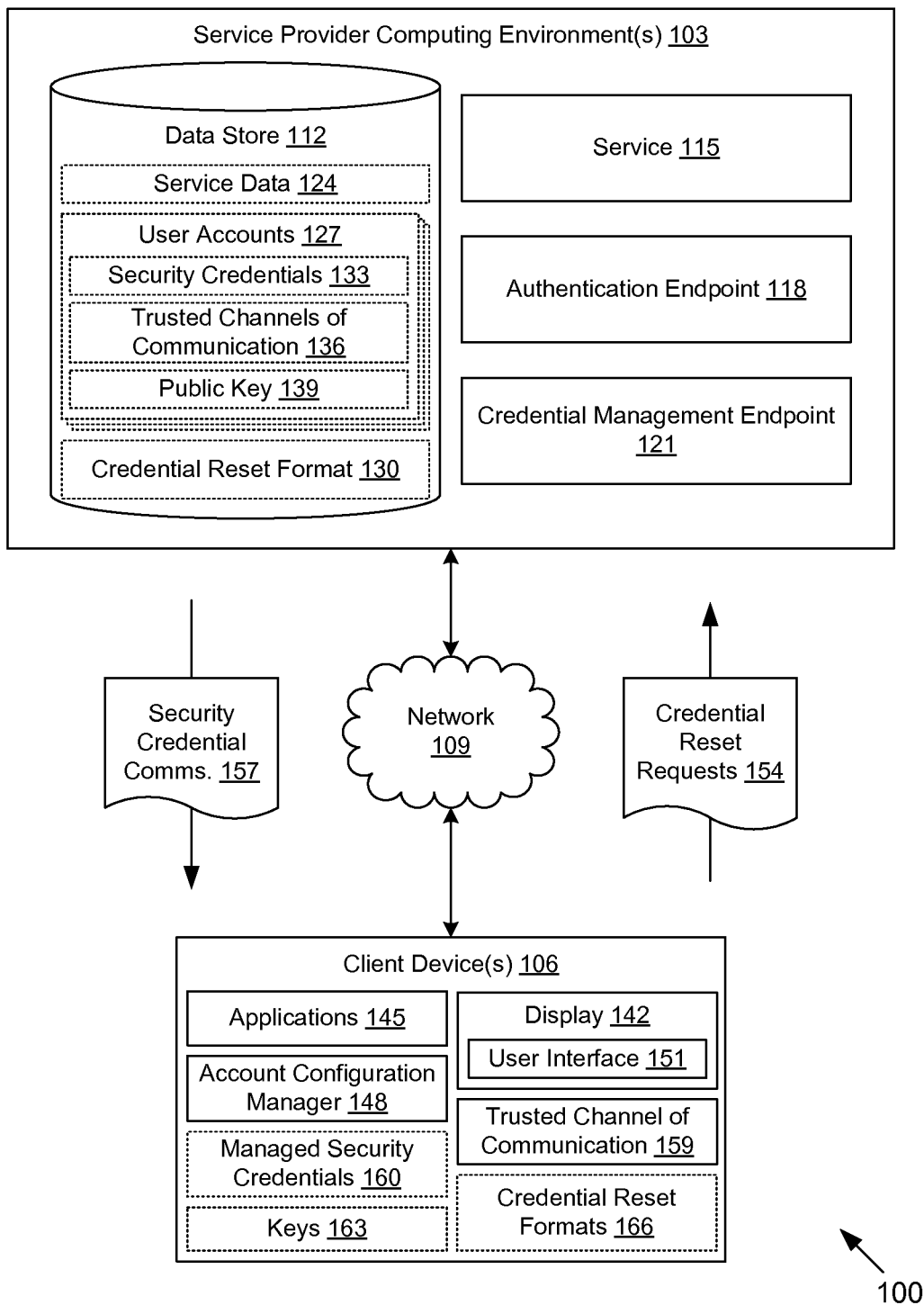
FIG. 1 is a drawing of a networked environment according to various embodiments of the present disclosure.

With reference to FIG. 1, shown is a networked environment 100 according to various embodiments. The networked environment 100 includes one or more service provider computing environments 103 and one or more client devices 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

There may be multiple service provider computing environments 103 corresponding to multiple service providers and services offered by the service providers. Services offered by such service providers may include email services, gaming services, social networking services, electronic commerce services, video-on-demand services, and so on. For purposes of convenience, the service provider computing environments 103 will be referred to herein in the singular. A user may have one or more accounts for each service. In some cases, a service provider may employ identity federation such that a user identity or account may be shared among multiple services and/or service providers.

The service provider computing environment 103 may comprise, for example, a server computer or any other system providing computing capability. Alternatively, the service provider computing environment 103 may employ a plurality of computing devices that are arranged, for example, in one or more server banks or computer banks or other arrangements. Such computing devices may be located in a single installation or may be distributed among many different geographical locations. For example, the service provider computing environment 103 may include a plurality of computing devices that together may comprise a cloud computing resource, a grid computing resource, and/or any other distributed computing arrangement. In some cases, the service provider computing environment 103 may correspond to an elastic computing resource where the allotted capacity of processing, network, storage, or other computing-related resources may vary over time.

Various applications and/or other functionality may be executed in the service provider computing environment 103 according to various embodiments. Also, various data is stored in a data store 112 that is accessible to the service provider computing environment 103. The data store 112 may be representative of a plurality of data stores 112 as can be appreciated. The data stored in the data store 112, for example, is associated with the operation of the various applications and/or functional entities described below.

The components executed on the service provider computing environment 103, for example, include a service 115, an authentication endpoint 118, a credential management endpoint 121, and other applications, services, processes, systems, engines, or functionality not discussed in detail herein. The service 115 is executed to provide functionality related to email, social networking, electronic commerce, video content delivery, and/or other types of services for which a user may have an account. The service 115 may encompass any number of back-end modules or logic to provide the particular functionality to client devices 106. The service 115 may communicate with client devices 106 over the network 109 by way of hypertext transfer protocol (HTTP), simple object access protocol (SOAP), representational state transfer (REST), real-time transport protocol (RTP), and/or other protocols and approaches. In one embodiment, the service 115 may correspond to a network site, such as a web site, which is accessed by way of a browser or other client application.

The authentication endpoint 118 is executed to authenticate client devices 106 for access to the service 115. To this end, the authentication endpoint 118 receives one or more security credentials from client devices 106 and determines whether the security credentials are valid for an account. Such credentials may include session identifiers, usernames, passwords, answers to knowledge-based questions, Kerberos tickets, Internet protocol (IP) addresses, and/or other forms of security credentials. In one embodiment, the authentication endpoint 118 may comprise one or more network pages including forms facilitating entry of security credentials. In another embodiment, the authentication endpoint 118 may comprise a uniform resource locator (URL) facilitating access to an application programming interface (API) for programmatic submissions of security credentials.

The credential management endpoint 121 is executed to facilitate management of security credentials for user accounts associated with the service 115. To this end, the credential management endpoint 121 may support credential changes and credential resets. A credential change may correspond to a situation where a previous security credential for an account is provided by a client device 106 for authentication purposes, and a replacement security credential is established by the client device 106 for the account. A credential reset may correspond to a situation where a previous security credential for an account is forgotten, lost, unknown, or otherwise not provided, and a new security credential or reset token is communicated to the owner of the account by way of a trusted channel of communication. In one embodiment, the credential management endpoint 121 may comprise one or more network pages including forms facilitating reset and/or change requests for security credentials. In another embodiment, the credential management endpoint 121 may comprise a uniform resource locator (URL) facilitating access to an application programming interface (API) for programmatic submissions of security credential reset and/or change requests.

The data stored in the data store 112 includes, for example, service data 124, user accounts 127, a credential reset format 130, and potentially other data. The service data 124 corresponds to various data resources employed by the service 115. To this end, the service data 124 may include hypertext markup language (HTML) data, extensible markup language (XML) data, images, audio, video, animations, executable code, and/or other data.

The user accounts 127 are employed by a user to authenticate to the authentication endpoint 118 for access to the service 115. The user accounts 127 may include, for example, security credentials 133, trusted channels of communication 136, public keys 139, and/or other data. The security credentials 133 include, for example, passwords, usernames, answers to knowledge-based questions, session identifiers, client device 106 identifiers, user biometric data, and/or any other credential data. The trusted channels of communication 136 correspond to one or more channels of communication to a trusted device for purposes of credential changes and/or resets. In other words, a trusted client device 106 may be an endpoint for one or more trusted channels of communication 136.

Such trusted channels of communication 136 are "trusted" in the sense that they are presumed to be controlled by the owner of the respective user account 127. In other words, access to a trusted channel of communication 136 may be used to authenticate the owner of the respective user account 127. The decision to trust a particular channel of communication may be made by an organization. For example, irrespective of whether email is inherently trustworthy or untrustworthy, email may be designated as a trusted channel of communication 136 by an organization that manages or provides the user accounts 127. Channels that are designated as trusted may later be designated as untrusted in some scenarios.

To illustrate the use of a trusted channel of communication 136, when creating a social networking account, a user may provide an email address for reset purposes. The provider of the social networking account may then trust that the email address is controlled by the user because access to the email account corresponding to the email address may facilitate resetting the password to the social networking account. It may be the case that the trusted channel of communication 136 employs a different communication protocol from what is employed by the user account 127. For example, the user account 127 may employ hypertext transfer protocol (HTTP), while the trusted channel of communication 136 may employ simple mail transfer protocol (SMTP).

Non-limiting examples of trusted channels of communication 136 may include email accounts, telephone lines, mailing addresses, social networking accounts, instant messaging systems, voice over internet protocol (VoIP) channels, mobile device management (MDM) channels, trusted input/output devices of the client devices 106 managed by a trusted platform module (TPM), near-field communications (NFC) channels, custom communications channels, and/or other channels of communication.

Certain types of trusted channels of communication 136, such as email and short message service (SMS), may terminate on multiple client devices 106. Other types of trusted channels of communication 136 are device specific, such that the trusted channel of communication 136 can only terminate at one specific client device 106. For example, a trusted channel of communication 136 may be tied to a specific mobile device by a device identifier. Communications through such a channel may be encrypted using the device identifier. Even if the data traffic to the mobile device is intercepted, it remains encrypted and otherwise unusable except for the specific mobile device.

The public keys 139 may correspond to a public-private key pair associated with the client device 106. In one embodiment, a public key 139 may be used to encrypt a communication to the client device 106 via the trusted channel of communication 136. For example, a communication that includes new security credentials 133 may be encrypted for the client device 106 using a public key 139 associated with user account 127. Other service-specific data may be stored in association with user accounts 127 such as, for example, browsing histories, order histories, watch lists, shopping lists, email data, social networking data, subscription data, contact information, demographic data, saved game states, and/or other data.

The credential reset format 130 corresponds to metadata that may specify network page forms and/or APIs to be employed for automatic reset and/or change of security credentials 133 via the credential management endpoint 121 for the service 115. The credential reset format 130 may specify URLs, form field names, data types for form fields, and/or other data to be used by the client device 106 in creating a credential reset and/or change request.

The client device 106 is representative of a plurality of client device 106 that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 142. The display 142 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various logic such as applications 145, an account configuration manager 148, and/or other executable logic. The applications 145 may be executed in a client device 106, for example, to access network content served up by services 115 in the service provider computing environment 103 and/or other servers, thereby rendering a user interface 151 on the display 142. The applications 145 may, for example, correspond to browsers, mobile applications, social networking applications, email applications, shopping applications, productivity applications, media applications, etc., and the user interface 151 may correspond to a network page, a mobile application screen, etc.

The account configuration manager 148 is executed to manage authentication of the applications 145 with respective services 115 by way of authentication endpoints 118. In one embodiment, the applications 145 may be configured to rely upon the account configuration manager 148 on an on-going basis to perform authentication. In another embodiment, the applications 145 may rely upon an integrated credential manager or an operating system-based credential manager to perform authentication. Further, the account configuration manager 148 may be executed to perform automatic initial configuration of applications 145 with regard to establishing credentials for services 115 as will be described. To this end, the account configuration manager 148 may initiate the sending of credential reset requests 154 to various credential management endpoints 121. In response, the account configuration manager 148 may receive and process security credential communications 157 sent by the service provider computing environment 103 via a trusted channel of communication 159 that has been configured in the client device 106.

The client device 106 may store various data, including, for example, managed security credentials 160, keys 163, credential reset formats 166, and/or other data. The managed security credentials 160 include various credentials that are managed, established, and/or received by the account configuration manager 148. In various scenarios, the account configuration manager 148 may be configured to automatically generate managed security credentials 160 according to security credential specifications. Also, the account configuration manager 148 may be configured to periodically rotate or change the managed security credentials 160 in an automated manner.

The keys 163 may correspond to public/private key pairs employed to encrypt and decrypt data via the trusted channel of communication 159 configured in the client device 106. For example, the service provider computing environment 103 may be configured to encrypt security credentials 133 such as reset tokens, temporary passwords, one-time passwords, etc. using a public key 139 that corresponds to a private key of the keys 163. The encrypted data may then be sent over an insecure network 109 using the trusted channel of communication 159. The credential reset formats 166 correspond to one or more credential reset formats 130 that have been obtained from one or more service provider computing environments 103. In one embodiment, the credential reset formats 166 may be obtained from another computing device such as a third-party server that functions as a repository for many credential reset formats 130. In some cases, the credential reset formats 166 may be crowd-sourced rather than distributed by the service providers.

Next, a general description of the operation of the various components of the networked environment 100 is provided. To begin, a user may configure a trusted channel of communication 159 on the client device 106. To this end, the user may configure an application 145 of the client device 106 to access an email account, social networking account, or other messaging account. In doing so, the user may enter credentials such as a username, password, and/or other credentials for the account. Where the trusted channel of communication 159 is a telephone line, a subscriber identity module (SIM) or other authentication-facilitating hardware component may be inserted into the client device 106. Alternatively, the client device 106 may be preconfigured to access the trusted channel of communication 159. Once the client device 106 has access to the trusted channel of communication 159, the client device may be regarded as a trusted device for specific user accounts 127, insofar as the trusted channel of communication 159 may be included in the trusted channels of communication 136 that are associated with the specific user accounts 127.

Various applications 145 may be preinstalled upon the client device 106 and/or may be downloaded to the client device 106 by the user. These applications 145 may be employed to access services 115 via a user account 127. The account configuration manager 148 facilitates automatic configuration of managed security credentials 160 for these applications 145 so that the applications 145 may access corresponding user accounts 127. For example, the user may indicate which applications 145 and/or services 115 are to be used. The user may specify usernames and/or other identifying credentials for the user accounts 127.

The account configuration manager 148 may then automatically initiate credential reset requests 154 to be sent to the respective credential management endpoints 121 via the network 109. One or more credential reset formats 166 are employed by the account configuration manager 148 to initiate the credential reset requests 154. It may be that different services 115 are associated with different credential reset formats 166. The account configuration manager 148 may be bundled with various credential reset formats 166, may request credential reset formats 130 from the specific service provider computing environments 103, or may request credential reset formats 130 from third-party servers.

In some scenarios, precisely which credential reset format 166 may be used for a credential reset request 154 may be unknown to the account configuration manager 148. In such cases, the account configuration manager 148 may attempt to initiate credential reset requests 154 by selecting a random credential reset format 166. The account configuration manager 148 may randomly try different credential reset formats 166 until one actually works, assuming that the credential management endpoints 121 provide feedback that an attempted reset fails.

A credential reset format 166 may define a particular URL to access along with a format for specifying a username or other identifier corresponding to the user account 127. The username or other identifier may be encoded, for example, as "GET" or "POST" data within an HTTP request. Other data may be specified, such as answers to knowledge-based questions. Such answers may be stored by the client device 106 in the managed security credentials 160 or elicited from the user as needed. For various services 115, the credential reset requests 154 may involve a back-and-forth with the corresponding credential management endpoint 121.

As a non-limiting example, the account configuration manager 148 may submit a credential reset request 154 to a credential management endpoint 121 for a username "jsmith545." In response the credential management endpoint 121 may request an answer to a knowledge-based question, e.g., "What is your favorite color?" The account configuration manager 148 may be configured by the credential reset format 166 to parse this request to determine the type of knowledge-based question. Then, the account configuration manager 148 can obtain a corresponding previously stored answer or prompt the user to provide an answer. The account configuration manager 148 next returns the answer to the credential management endpoint 121.

In response to the credential reset request 154 being initiated, the credential management endpoint 121 sends a security credential communication 157 to one or more trusted channels of communication 136 previously associated with the particular user account 127. The security credential communication 157 may include a one-time password, a temporary password, a password reset token, a session token, a device-specific credential that is specific to the client device 106 and/or other type of security credential 133. In one embodiment, the credential management endpoint 121 may encrypt the security credential communication 157 using a public key 139 associated with the user account 127.

In one embodiment, the security credential communication 157 may be sent via multiple trusted channels of communication 159 using an approach such as Shamir's Secret Sharing or another approach. As a non-limiting example, a security credential communication 157 may correspond to a password, and the password may be split into two parts. The first part may be sent to a first email address, and the second part may be sent to a telephone number as a text message. Recovery of both portions of the security credential communication 157 may be necessary to gain access to the corresponding user account 127. In one scenario, a portion of a password or other credential may be assumed to be known by the user and not sent in the security credential communication 157.

The account configuration manager 148 may automatically intercept the security credential communication 157 received via the trusted channel(s) of communication 159. Where the security credential communication 157 is encrypted, the account configuration manager 148 may decrypt the security credential communication 157 using the keys 163. Per the particular credential reset format 166, the account configuration manager 148 may automatically parse the security credential communication 157 (which may be in the form of text, audio, images, etc.) to extract one or more security credentials 133. The extracted security credentials 133 may be ready for use to authenticate the application 145 to the authentication endpoint 118. If so, the extracted security credentials 133 may be added to the managed security credentials 160, and the application 145 may be configured to employ the managed security credentials 160 for authentication.

Alternatively, where the extracted security credentials 133 include a reset token, reset URL, or temporary password, the account configuration manager 148 may be configured to communicate with the credential management endpoint 121 using the extracted security credentials 133 in order to establish new security credentials 133. Such security credentials 133 may be automatically generated by the account configuration manager 148 and then communicated to the credential management endpoint 121 by way of form filling and/or an API. The format for communication may be specified by a credential reset format 166. In some cases, the security credential communication 157 may include metadata specifying the format for communication. Upon registration of a new security credential 133 with the credential management endpoint 121, the new security credential 133 may be added to the managed security credentials 160, and the application 145 may be configured to employ the managed security credentials 160 for authentication. In some cases, multiple applications 145 may be configured to share a managed security credential 160 for a single user account 127. Such credential sharing may be automatic pursuant to configuration data, for example, and may be subject to a manual confirmation or override.

In this manner, managed security credentials 160 may be established automatically for a number of different applications 145 and a number of different services 115 corresponding to multiple user accounts 127. In this way, configuration of a new client device 106 becomes greatly simplified for the user. For example, in some cases, the user configures only the trusted channel of communication 159, and the security credential configuration for the rest of the applications 145 is automated. When a user installs an additional application 145, the credential configuration for the additional application 145 may proceed in a similar automated manner. It is noted that in some cases, a plurality of different services 115 may employ the same user account 127 or identity. Further, in some cases, a single application 145, e.g., a browser or another application 145, may be configured for multiple user accounts 127 for one or more services 115. For example, a user may have separate user accounts 127 for personal and business use.

The automated configuration of managed security credentials 160 as described herein may be utilized for session authentication in addition to initial application setup. The result of a credential reset request 154 may be a session token returned via the security credential communication 157. The application 145 may be configured with the session token for authentication with the authentication endpoint 118 for the duration of the session, e.g., until the application 145 is closed, until a log out from the session, for a predefined time period, or another duration.

The system described herein may be capable of supporting multiple client devices 106 for a user. In one embodiment, one client device 106 may be capable of exchanging and synchronizing the managed security credentials 160 with another client device 106 via Bluetooth®, near-field communication (NFC), or another networking approach. The managed security credentials 160 may each be associated with the last reset time so that the most recent managed security credentials 160 may be determined and populated on each of the client devices 106. The client devices 106 among which the managed security credentials 160 are synchronized may be paired using various pairing approaches. In another embodiment, the managed security credentials 160 may be specific to a particular client device 106, and potentially specific to the client device 106 being in a certain location or meeting other criteria. Thus, in such an embodiment, a credential reset would not necessarily revoke other managed security credentials 160 for other client devices 106.

The account configuration manager 148 may employ various techniques for credential management and rotation, portability of credentials across multiple client devices 106, and other functions. For example, techniques relating to authentication management are described by U.S. Patent Application entitled "AUTHENTICATION MANAGER" filed on Aug. 12, 2009, having application Ser. No. 12/539,886; U.S. Patent Application entitled "MANAGING SECURITY CREDENTIALS" filed on Jul. 29, 2011, having application Ser. No. 13/194,287; U.S. Patent Application entitled "ACCOUNT MANAGEMENT FOR MULTIPLE NETWORK SITES" filed on Feb. 1, 2012, having application Ser. No. 13/363,654; U.S. Patent Application entitled "AUTHENTICATION MANAGEMENT SERVICES" filed on Feb. 1, 2012, having application Ser. No. 13/363,664; U.S. Patent Application entitled "PRESENTING MANAGED SECURITY CREDENTIALS TO NETWORK SITES" filed on Feb. 1, 2012, having application Ser. No. 13/363,675; U.S. Patent Application entitled "RECOVERY OF MANAGED SECURITY CREDENTIALS" filed on Feb. 1, 2012, having application number Ser. No. 13/363,681; U.S. Patent Application entitled "LOGOUT FROM MULTIPLE NETWORK SITES" filed on Feb. 1, 2012, having application Ser. No. 13/363,685; U.S. Patent Application entitled "MAPPING STORED CLIENT DATA TO REQUESTED DATA USING METADATA" filed on Nov. 16, 2012, having application Ser. No. 13/679,254, which are incorporated herein by reference in their entirety. Various techniques relating to authentication using a trusted device are described by U.S. patent application Ser. No. 13/228,192 entitled "PASSWORDLESS STRONG AUTHENTICATION USING TRUSTED DEVICES" and filed on Sep. 8, 2011, which is incorporated herein by reference in its entirety.

Figure 2A:
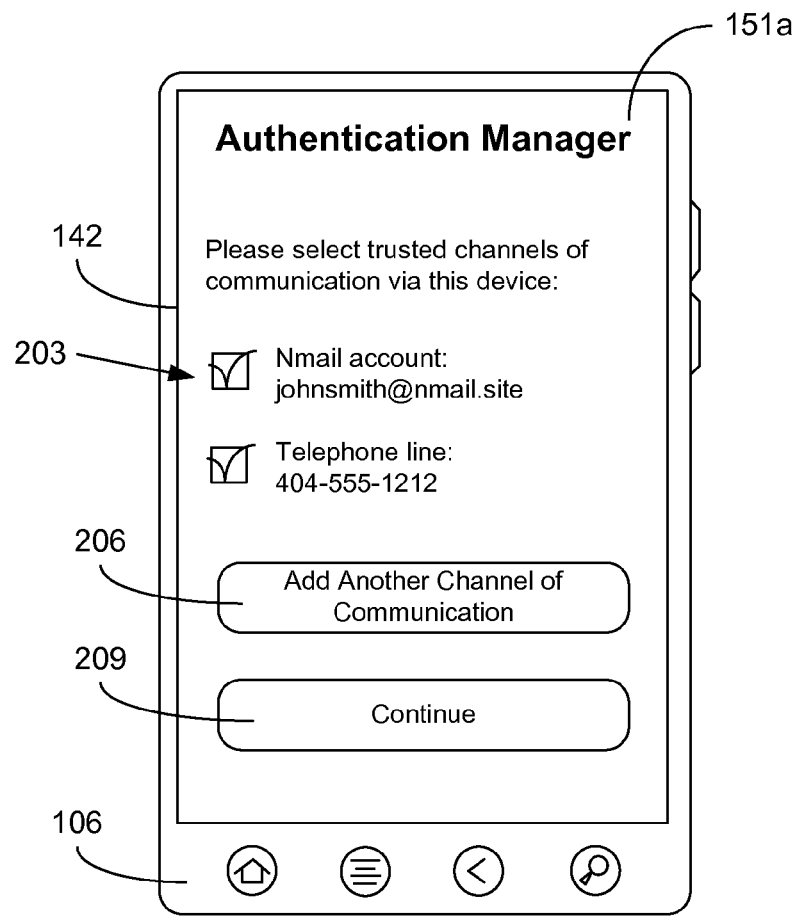
FIGS. 2A-2C are drawings of example user interfaces rendered by a client device in the networked environment of FIG. 1 according to various embodiments of the present disclosure.

Referring next to FIG. 2A, shown is one example of a user interface 151a rendered on a display 142 of a client device 106 from the networked environment 100 (FIG. 1). The user interface 151a is rendered by the account configuration manager 148 (FIG. 1) for the user to specify trusted channels of communication 159 (FIG. 1) that have been configured for the client device 106. To this end, the account configuration manager 148 may automatically detect email accounts, social networking accounts, telephone lines, and/or other channels of communication that have been configured. A listing 203 may be provided to allow the user to select or deselect various channels that have been automatically detected and previously configured. In this non-limiting example, an email account and a telephone line have been detected. A channel addition component 206 may be provided for the user to configured another channel of communication, e.g., to allow a user to configure another email account or other channel. A continue component 209 may be provided for the user to accept the selection via the listing 203 and continue to the next stage in a configuration procedure.

Figure 2B:
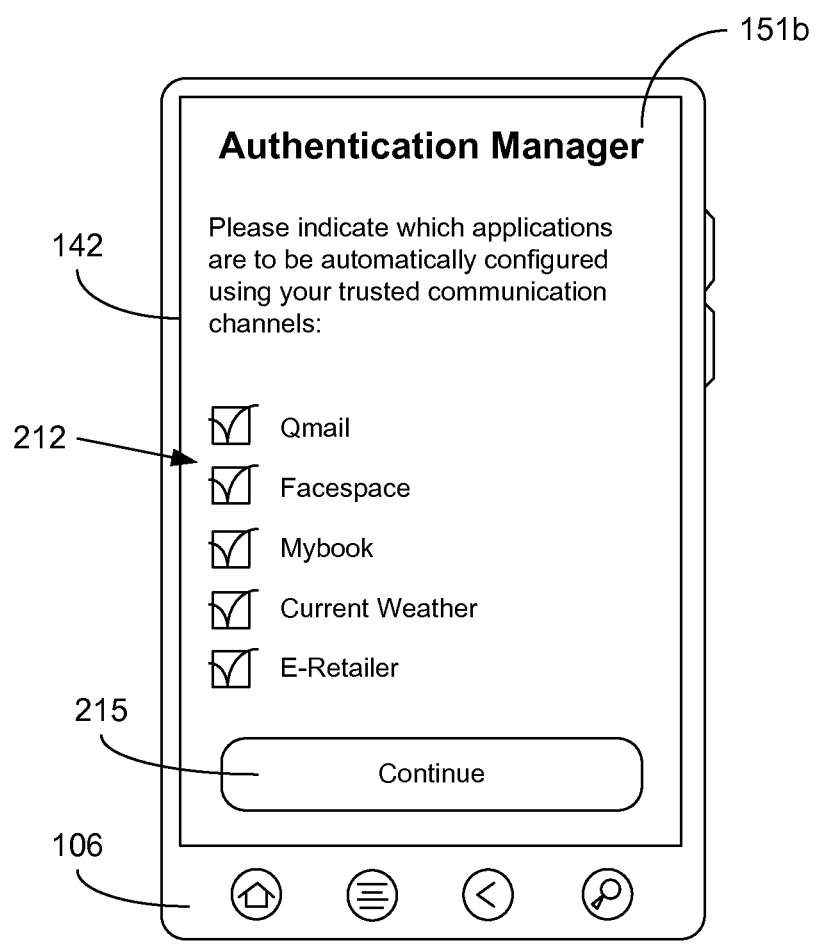

Turning now to FIG. 2B, shown is one example of a user interface 151b rendered on a display 142 of a client device 106 from the networked environment 100 (FIG. 1). The user interface 151b is rendered by the account configuration manager 148 (FIG. 1) for the user to indicate specific applications 145 (FIG. 1) and/or specific services 115 (FIG. 1) with which the application 145 communicate. Automatic configuration of the applications 145 and/or services 115 may then proceed based at least in part on the identified applications 145 and/or services 115. The user interface 151b includes a listing 212 of detected applications 145 and/or services 115 in the client device 106. The user may select or deselect which applications 145 and/or services 115 are to be automatically configured via the trusted channels of communication 159 (FIG. 1). A continue component 215 may be provided for the user to accept the selection via the listing 212 and continue to the next stage in a configuration procedure.

Figure 2C:
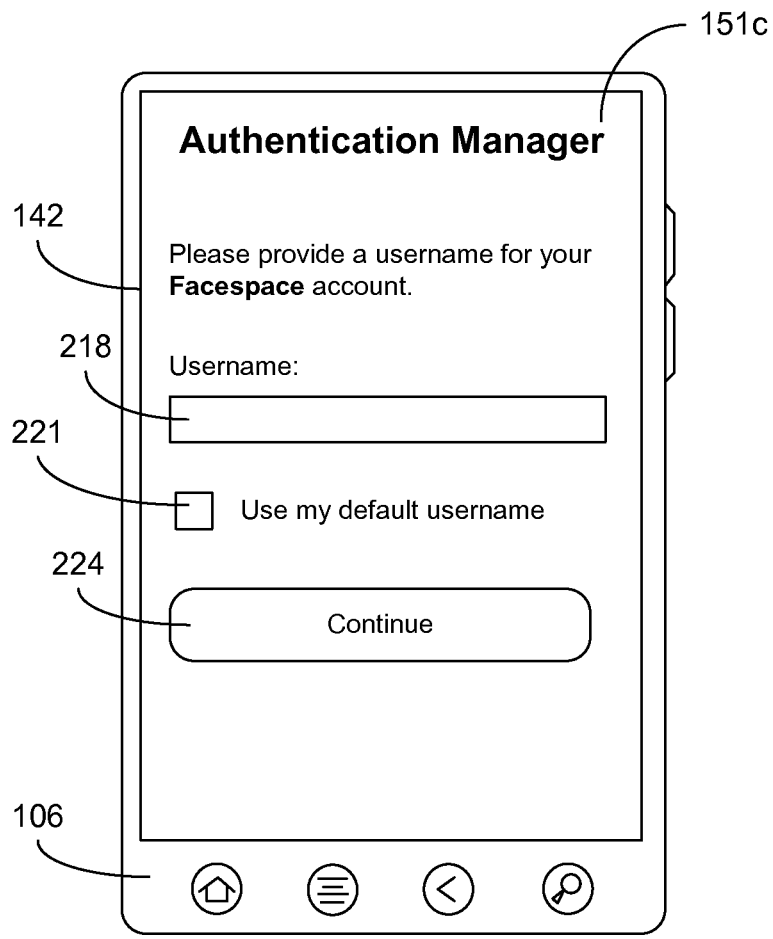

Moving on to FIG. 2C, shown is one example of a user interface 151c rendered on a display 142 of a client device 106 from the networked environment 100 (FIG. 1). The user interface 151c is rendered by the account configuration manager 148 (FIG. 1) for the user to specify a username or otherwise indicate an initial credential to identify the particular user account 127 (FIG. 1) for an application 145 or service 115 (FIG. 1). To this end, the user interface 151c includes a username field 218 through which the user may enter the username. The user interface 151c may also include a default username selection component 221 to allow a previously configured default username to be employed when selected. For example, a user may typically employ their primary email address as a username, and the user may configure this username as the default username in the account configuration manager 148. A continue component 224 may be provided for the user to accept the username setting for the particular application 145 and/or service 115 and continue to the next stage in a configuration procedure.

Continuing next to FIG. 3A, shown is an example security credential communication 157a received by the account configuration manager 148 (FIG. 1) from a credential management endpoint 121 (FIG. 1). The security credential communication 157a corresponds to a password reset email that includes a reset token 303. The account configuration manager 148 may be configured to automatically intercept and parse this password reset email and thereby extract the reset token 303. A credential reset format 166 (FIG. 1) may, for example, define the reset token 303 as being the text following the "=" character at the end of the third paragraph of the password reset email. The reset token 303 may be automatically extracted by the account configuration manager 148. The account configuration manager 148 may then employ the reset token 303 to finish programmatically resetting the security credentials 133 (FIG. 1) for the corresponding user account 127 (FIG. 1) and to gain access to a corresponding service 115 (FIG. 1).

Figure 3B:
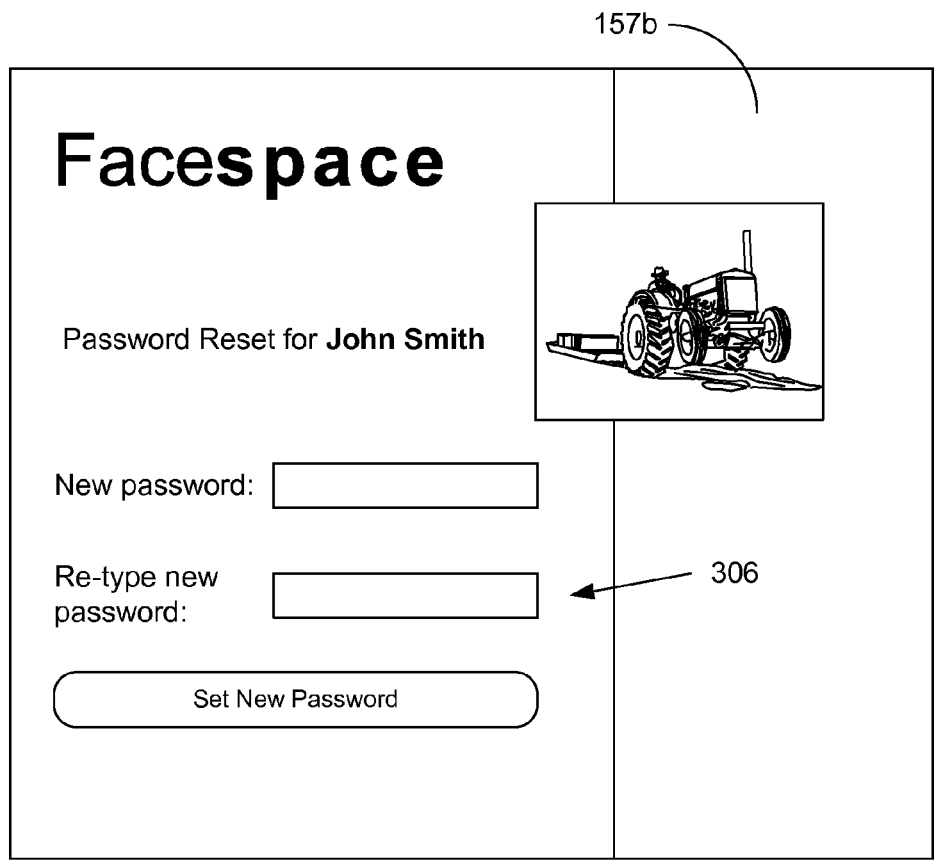
FIG. 3B is a drawing of an example network page employed as a security credential communication in the networked environment of FIG. 1 according to various embodiments of the present disclosure.

Referring next to FIG. 3B, shown is one example of a security credential communication 157b that may be returned to the account configuration manager 148 (FIG. 1) upon submitting a credential reset request 154 (FIG. 1) specifying the reset token 303 (FIG. 1) of FIG. 3A. In particular, the security credential communication 157b corresponds to a rendered network page. It is noted that the underlying code for the network page may be interpreted programmatically by the account configuration manager 148 without being rendered upon the display 142 (FIG. 1). However, for purposes of discussion, the network page is shown in FIG. 3B as it may be graphically rendered upon the display 142.

The network page is customized for resetting the security credentials 133 (FIG. 1) for a particular user account 127 (FIG. 1) determined based at least in part on the reset token 303 that was presented. In this case, the user account 127 is for "John Smith." A profile image or other predetermined content may be rendered in the network page to confirm to the owner of the user account 127 that the network page has originated from the authentic source. A form 306 is provided for entry of a new security credential 133 (FIG. 1), i.e., a new password. The new password may be automatically generated by the account configuration manager 148 and established with the credential management endpoint 121 by automatically filling and submitting the form 306. The account configuration manager 148 may be configured to fill the form 306 correctly based at least in part upon metadata within the network page and/or based at least in part upon a credential reset format 166 (FIG. 1).

The credential management endpoint 121 may then return a response verifying whether the security credential 133 has been successfully established. If correctly established, the account configuration manager 148 may then store the credential in the managed security credentials 160 (FIG. 1) and configure the corresponding application 145 (FIG. 1) to use the managed security credential 160. If not correctly established, the account configuration manager 148 may repeat the credential reset request 154 and/or request manual user intervention.

Figure 4:
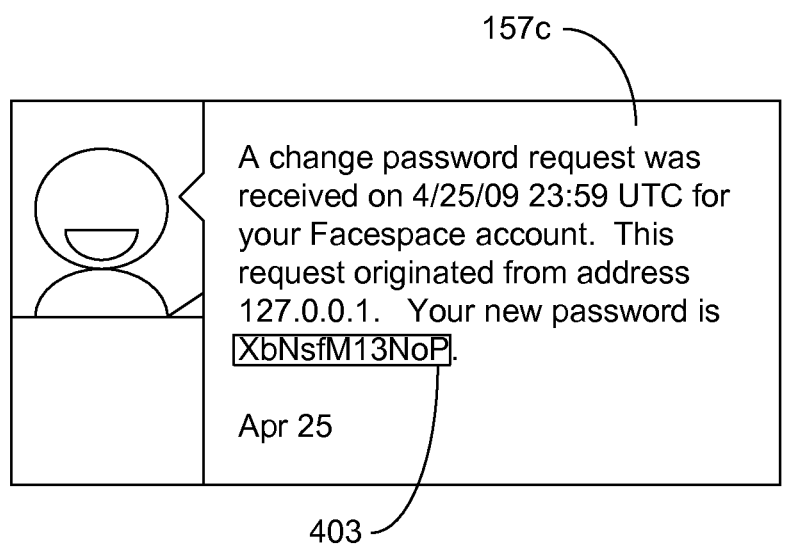
FIG. 4 is a drawing of an example text message employed as a security credential communication in the networked environment of FIG. 1 according to various embodiments of the present disclosure.

Moving on to FIG. 4, shown is an example security credential communication 157c received by the account configuration manager 148 (FIG. 1) from a credential management endpoint 121 (FIG. 1). The security credential communication 157c corresponds to a password reset text message that includes a new password 403. The account configuration manager 148 may be configured to automatically intercept and parse this password reset text message and thereby extract the new password 403. In some scenarios, the text message would not be displayed for the user. For example, an SMS control message may be employed for the security credential communication 157c.

A credential reset format 166 may, for example, define the new password 403 as being the text following a whitespace character at the end of the text message, not including the trailing period. The account configuration manager 148 may then employ the new password 403 to finish configuring an application 145 (FIG. 1) to access a service 115 (FIG. 1) using the new password 403.

Figure 5:
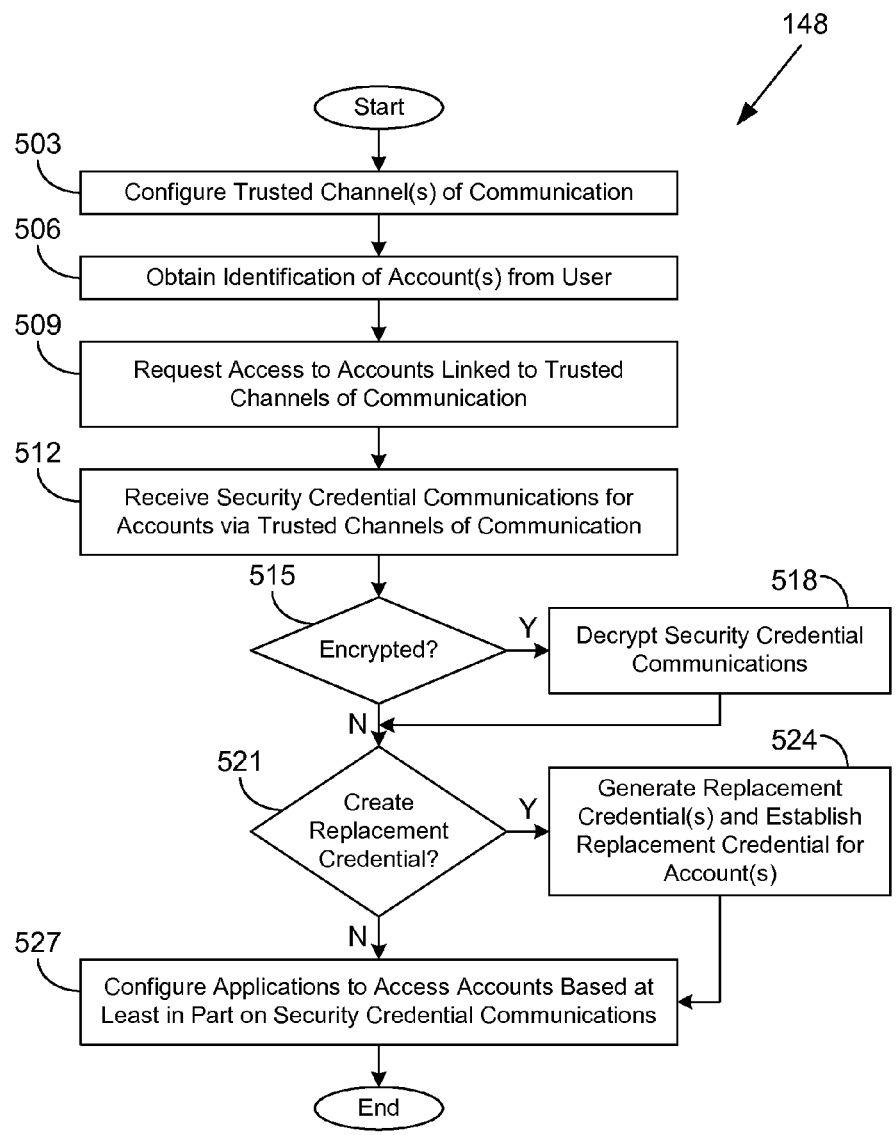
FIG. 5 is a flowchart illustrating one example of functionality implemented as portions of account configuration manager executed in a client device in the networked environment of FIG. 1 according to various embodiments of the present disclosure.

Referring next to FIG. 5, shown is a flowchart that provides one example of the operation of a portion of the account configuration manager 148 according to various embodiments. It is understood that the flowchart of FIG. 5 provides merely an example of the many different types of functional arrangements that may be employed to implement the operation of the portion of the account configuration manager 148 as described herein. As an alternative, the flowchart of FIG. 5 may be viewed as depicting an example of steps of a method implemented in the client device 106 (FIG. 1) according to one or more embodiments.

Beginning with box 503, the account configuration manager 148 configures one or more trusted channels of communication 159 (FIG. 1) in the client device 106. Such trusted channels of communication 159 may be preconfigured in the client device 106. Alternatively, trusted channels of communication 159 may be configured by the user via a user interface 151 (FIG. 1) similar to that shown in FIG. 2A. Through such a user interface 151, the user may indicate which of the trusted channels of communication 159 are to be monitored for security credential communications 157 (FIG. 1). The client device 106 may be configured to access an email account or other trusted channel of communication 159 in response to receiving credentials for the email account.

In box 506, the account configuration manager 148 obtains an identification of user accounts 127 (FIG. 1) for which authentication is to be configured by the account configuration manager 148. For example, a user interface 151 such as that shown in FIG. 2B may be employed for a user to select from multiple detected applications 145 (FIG. 1) and/or services 115 accessed by the applications 145. A user may specify usernames and/or other identifying information for the user accounts 127. In another embodiment, the identifiers or usernames for the user accounts 127 may be centrally stored. For example, a user may supply a single identifier which may be used by the account configuration manager 148 to obtain a collection of identifiers from a networked data store.

In box 509, the account configuration manager 148 requests access to the user accounts 127, which are linked to the trusted channels of communication 136 (FIG. 1). For example, a user account 127 may be preconfigured so that password reset emails go to a specific email account corresponding to a trusted channel of communication 136. In requesting access, the account configuration manager 148 submits access requests such as one or more credential reset requests 154 to one or more credential management endpoints 121 (FIG. 1) corresponding to the user accounts 127 via the network 109 (FIG. 1).

In box 512, the account configuration manager 148 receives one or more security credential communications 157 for the user accounts 127 via the trusted channels of communication 159. Such security credential communications 157 may include email messages as in FIG. 3A, network pages as in FIG. 3B, text messages as in FIG. 4, telephone voice calls, and/or other forms of communication. In box 515, the account configuration manager 148 determines whether the security credential communication 157 is encrypted. If the security credential communication 157 is encrypted, the account configuration manager 148 decrypts it in box 518 using the keys 163 (FIG. 1). The account configuration manager 148 continues to box 521. If the security credential communication is not encrypted, the account configuration manager 148 proceeds directly from box 515 to box 521.

In box 521, the account configuration manager 148 determines whether to create a replacement security credential 133 (FIG. 1). For example, the security credential communication 157 may have returned a reset token 303 (FIG. 3A) for establishing a new password, or the security credential communication 157 may have returned a temporary password that may be changed. If a replacement security credential 133 is to be created, the account configuration manager 148 moves to box 524 and generates the replacement security credential 133. Further, the account configuration manager 148 authenticates with the credential management endpoint 121 and attempts to establish the replacement security credential 133 for the user account 127 via a credential change interface (e.g., FIG. 3B) while authenticated. In some embodiments, a replacement security credential 133 may be supplied contemporaneously with an authentication token. The account configuration manager 148 continues to box 527. If a replacement security credential 133 is not to be created, the account configuration manager 148 continues from box 521 to box 527.

In box 527, the account configuration manager 148 configures one or more applications 145 to access the services 115 via the user accounts 127 based at least in part on the security credential communications 157. In doing so, the account configuration manager 148 may store the security credentials 133 in the managed security credentials 160 (FIG. 1). The account configuration manager 148 may configure an application-specific credential manager and/or an operating system credential manager to use the security credentials 133. Alternatively, the account configuration manager 148 may detect when the various applications 145 are ready to authenticate (e.g., presenting a username/password form) and then provide the corresponding managed security credentials 160 by way of form filling or an API. Thereafter, the portion of the account configuration manager 148 ends.

Figure 6:
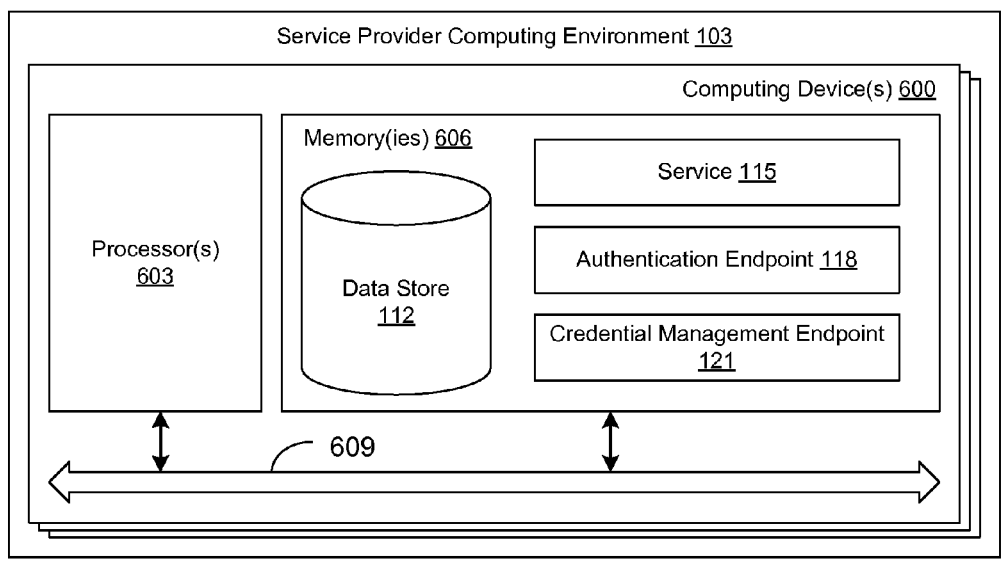
FIG. 6 is a schematic block diagram that provides one example illustration of a service provider computing environment employed in the networked environment of FIG. 1 according to various embodiments of the present disclosure.

With reference to FIG. 6, shown is a schematic block diagram of the service provider computing environment 103 according to an embodiment of the present disclosure. The service provider computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the service 115, the authentication endpoint 118, the credential management endpoint 121, and potentially other applications. Also stored in the memory 606 may be a data store 112 and other data. In addition, an operating system may be stored in the memory 606 and executable by the processor 603.

Figure 7:
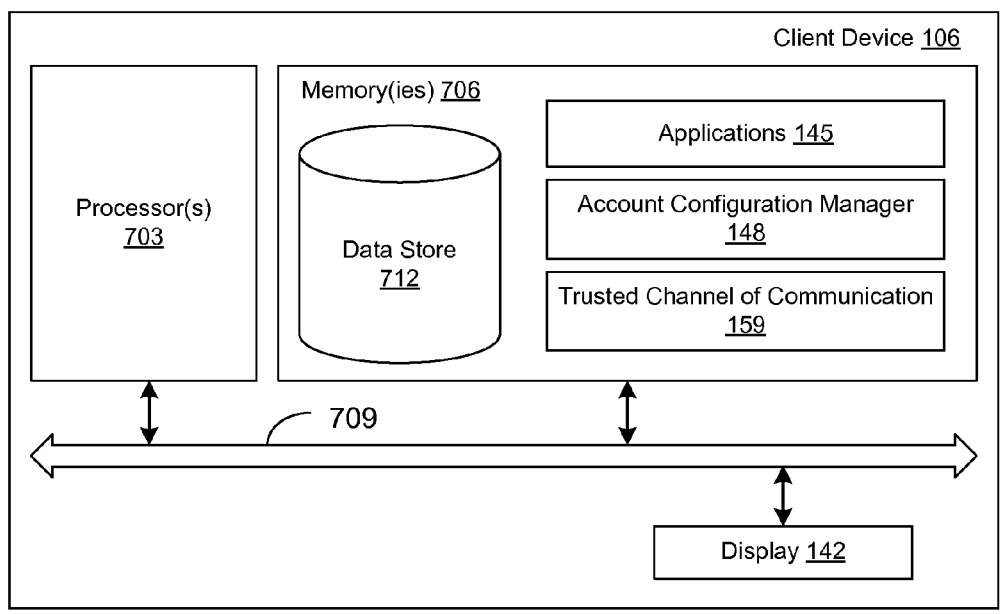
FIG. 7 is a schematic block diagram that provides one example illustration of a client device employed in the networked environment of FIG. 1 according to various embodiments of the present disclosure.

With reference to FIG. 7, shown is a schematic block diagram of the client device 106 according to an embodiment of the present disclosure. The client device 106 includes at least one processor circuit, for example, having a processor 703, a memory 706, and a display 142, all of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the applications 145, the account configuration manager 148, the trusted channel of communication 159 (which may correspond to an application 145 or a dedicated device), and potentially other applications. Also stored in the memory 706 may be a data store 712 and other data. In addition, an operating system may be stored in the memory 706 and executable by the processor 703.

Referring now to both FIGS. 6 and 7, it is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the service 115, the authentication endpoint 118, the credential management endpoint 121, the account configuration manager 148, the applications 145, the trusted channel of communication 159, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the account configuration manager 148. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service 115, the authentication endpoint 118, the credential management endpoint 121, the applications 145, the trusted channel of communication 159, and the account configuration manager 148, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable by a client computing device, comprising:
    code that, in response to receiving a security credential for an email account from a user, configures the client computing device to access the email account, the email account being designated as a trusted channel of communication by an organization associated with one of a plurality of accounts;
    code that, in response to receiving an identification of the plurality of accounts from the user, automatically sends a credential access request to a plurality of services corresponding to the plurality of accounts; and
    code that, in response to receiving a respective email message for individual ones of the plurality of accounts, automatically configures a plurality of applications executable by the client computing device to access the plurality of accounts based at least in part on respective security credentials received in the respective email messages.

2. The non-transitory computer-readable medium of claim 1, further comprising code that synchronizes the respective security credentials with another client computing device.

3. The non-transitory computer-readable medium of claim 1, further comprises code that automatically establishes a respective replacement security credential for individual ones of the plurality of accounts.

4. A system, comprising:
    a client computing device configured to access a trusted channel of communication; and
    an account configuration manager executable by the client computing device, the account configuration manager comprising:
        logic that automatically sends an access request to a credential management endpoint corresponding to at least one account linked to the trusted channel of communication;
        logic that, in response to receiving a respective credential reset token for the at least one account via the trusted channel of communication, provides the respective credential reset token to a service corresponding to the at least one account; and
        logic that, in response to receiving a respective replacement security credential from the service, configures at least one application executable by the client computing device to access the at least one account based at least in part on the respective replacement security credential.

5. The system of claim 4, wherein the at least one application accesses the at least one account using a first communication protocol, and the respective credential reset token is received via the trusted channel of communication using a second communication protocol.

6. The system of claim 4, wherein the account configuration manager further comprises logic that receives an identification of the at least one account from a user.

7. The system of claim 6, wherein the identification comprises a respective username for the at least one account.

8. The system of claim 4, wherein the at least one application comprises a plurality of applications, and individual ones of the plurality of applications are configured to access the at least one account by the logic that configures.

9. The system of claim 4, wherein the at least one application comprises a single application, the at least one account comprises a plurality of accounts, and the single application is configured to access at least two of the plurality of accounts by the logic that configures.

10. The system of claim 4, wherein the trusted channel of communication comprises an email account, and the respective credential reset token is received in an email message.

11. The system of claim 4, wherein the trusted channel of communication comprises a telephone line, and the respective credential reset token is received via at least one of a text message or a telephone call.

12. The system of claim 4, wherein the access request corresponds to a security credential reset request.

13. The system of claim 4, wherein the access request includes a public key, and the respective credential reset token is encrypted using the public key.

14. A system, comprising:
a client computing device configured to access a trusted channel of communication; and
an account configuration manager executable by the client computing device, the account configuration manager comprising:
logic that automatically sends an access request to a credential management endpoint corresponding to at least one account linked to the trusted channel of communication;
logic that, in response to receiving a respective security credential communication for the at least one account via the trusted channel of communication, configures at least one application executable by the client computing device to access the at least one account based at least in part on the respective security credential communication; and
wherein the trusted channel of communication comprises a first trusted channel of communication and a second trusted channel of communication, a first portion of the respective security credential communication is received via the first trusted channel of communication, a second portion of the respective security credential communication is received via the second trusted channel of communication, and a security credential is split across the first portion and the second portion.

15. A system, comprising:
a client computing device configured to access a trusted channel of communication; and
an account configuration manager executable by the client computing device, the account configuration manager comprising:
logic that automatically sends a security credential reset request to a credential management endpoint corresponding to at least one account linked to the trusted channel of communication;
logic that, in response to receiving a respective security credential communication for the at least one account via the trusted channel of communication, configures at least one application executable by the client computing device to access the at least one account based at least in part on the respective security credential communication; and
wherein the security credential reset request includes a public key, and the respective security credential communication is encrypted using the public key.

16. The system of claim 15, wherein the respective security credential communication comprises at least one of: a replacement security credential, a temporary security credential, or a device-specific security credential that is specific to the client computing device.

17. A method, comprising:
receiving, by a client computing device, an identification of an account from a user;
automatically requesting, by the client computing device, a security credential reset corresponding to the account, the account being linked to a trusted channel of communication for reset purposes;
receiving, by the client computing device, a security credential communication corresponding to the account via the trusted channel of communication; and
automatically configuring, by the client computing device, at least one application to access the account based at least in part on the security credential communication.

18. The method of claim 17, further comprising:
parsing, by the client computing device, the security credential communication to obtain a reset token;
authenticating, by the client computing device, with a service corresponding to the account using the reset token; and
communicating, by the client computing device, with the service while authenticated to establish at least one replacement security credential for the account.

19. The method of claim 17, further comprising:
receiving, by the client computing device, data describing a security credential reset format for the account from another computing device; and
wherein the security credential reset is automatically requested based at least in part on the data describing the security credential reset format.

20. The method of claim 17, further comprising requesting, by the client computing device, the security credential reset based at least in part on an answer to a knowledge-based question.

* * * * *